(12) United States Patent
Down (10) Patent No.: US 9,482,112 B2
(45) Date of Patent: Nov. 1, 2016

(54) GAS TURBINE COMPRISING A HEAT SHIELD AND METHOD OF OPERATION

(75) Inventor: Andrew Down, Dursley (GB)

(73) Assignee: SIEMENS AKTIENGESELLSCHAFT, München (DE)

( * ) Notice: Subject to any disclaimer, the term of this patent is extended or adjusted under 35 U.S.C. 154(b) by 608 days.

(21) Appl. No.: 14/009,590

(22) PCT Filed: Mar. 23, 2012

(86) PCT No.: PCT/EP2012/055204
§ 371 (c)(1),
(2), (4) Date: Jan. 13, 2014

(87) PCT Pub. No.: WO2012/136493
PCT Pub. Date: Oct. 11, 2012

(65) Prior Publication Data
US 2014/0144155 A1    May 29, 2014

(30) Foreign Application Priority Data

Apr. 4, 2011  (EP) .................................... 11160988

(51) Int. Cl.

| F01D 25/12 | (2006.01) |
|---|---|
| F02C 7/18 | (2006.01) |
| F01D 25/14 | (2006.01) |
| F01D 9/04 | (2006.01) |
| F01D 11/08 | (2006.01) |

(52) U.S. Cl.
CPC .............. *F01D 25/14* (2013.01); *F01D 9/042* (2013.01); *F01D 11/08* (2013.01); *F02C 7/18* (2013.01); *F01D 25/12* (2013.01); *F05D 2240/15* (2013.01)

(58) Field of Classification Search
CPC .............. F02C 7/12; F02C 7/16; F02C 7/18; F02C 7/185; F01D 9/023; F01D 9/06; F01D 9/065; F01D 25/08; F01D 25/12
USPC .................................................. 415/115, 116
See application file for complete search history.

(56) References Cited

U.S. PATENT DOCUMENTS

| 2,859,934 A | 11/1958 | Gay |
|---|---|---|
| 3,597,102 A | 8/1971 | Burton |
| 3,730,640 A | 5/1973 | Iverson |
| 4,157,232 A | 6/1979 | Riedmiller |

(Continued)

FOREIGN PATENT DOCUMENTS

| CN | 1532376 A | 9/2004 |
|---|---|---|
| EP | 0616112 A1 | 9/1994 |

(Continued)

*Primary Examiner* — Justin Larson (57) ABSTRACT

A turbine has a first and second inner wall, an inner casing and a shield element. The first and second inner walls are mounted to the inner casing such that an inner volume for working fluid is separated from an outer volume for cooling fluid. The first and second inner walls and inner casing are arranged to form a cavity in outer volume. The shield element is arranged inside cavity to separate cavity in an inner and outer region in a radially outer position to the inner region. A gap is formed between the first and second inner walls for working fluid between the inner volume and inner region. The shield element is arranged in cavity to form a fluid inlet for injecting cooling fluid from outer region to inner region for generating a predefined recirculation of working fluid and cooling fluid inside inner region.

9 Claims, 3 Drawing Sheets

(56) References Cited

U.S. PATENT DOCUMENTS

| | | | |
|---|---|---|---|
| 4,551,064 A | 11/1985 | Pask | |
| 5,330,321 A | 7/1994 | Leonard | |
| 6,302,642 B1* | 10/2001 | Nagler | F01D 11/24 415/116 |
| 6,402,466 B1 | 6/2002 | Sexton | |
| 7,997,856 B2* | 8/2011 | Khanin | F01D 11/08 415/116 |
| 8,257,017 B2* | 9/2012 | Down | F01D 11/24 415/1 |
| 8,979,482 B2* | 3/2015 | Khanin | F01D 11/10 415/115 |
| 9,328,626 B2* | 5/2016 | Duelm | F01D 25/08 |
| 2005/0123389 A1 | 6/2005 | Howe | |
| 2009/0317242 A1* | 12/2009 | Down | F01D 11/24 415/176 |
| 2010/0047062 A1* | 2/2010 | Khanin | F01D 11/08 415/175 |
| 2014/0144155 A1* | 5/2014 | Down | F01D 9/042 60/782 |
| 2014/0205447 A1* | 7/2014 | Patat | F01D 9/065 415/177 |
| 2014/0234073 A1* | 8/2014 | Moreton | F01D 9/00 415/1 |

FOREIGN PATENT DOCUMENTS

| | | |
|---|---|---|
| EP | 1488643 A2 | 12/2004 |
| RU | 2266477 C2 | 12/2005 |
| RU | 2303138 C2 | 7/2007 |

* cited by examiner

GAS TURBINE COMPRISING A HEAT SHIELD AND METHOD OF OPERATION

CROSS REFERENCE TO RELATED APPLICATIONS

This application is the US National Stage of International Application No. PCT/EP2012/055204 filed Mar. 23, 2012 and claims benefit thereof, the entire content of which is hereby incorporated herein by reference. The International Application claims priority to the European application No. 00060988.9 EP filed Apr. 4, 2011, the entire contents of which is hereby incorporated herein by reference.

FIELD OF INVENTION

The present invention relates to a turbine with a heat shield and to a method of operating a turbine with a heat shield.

ART BACKGROUND

In turbines, in particular in turbine stages of turbines, turbine parts, such as inner walls or platforms, are exposed to hot working fluid of the turbine. Hence, cooling systems are used for cooling the turbine parts.

For cooling purposes, cooling air systems are installed for providing a cooling air stream to the hot turbine parts and/or preventing the hot stream of combustion gases to escape past the inner and outer walls of the main flow annulus. The space for installing a cooling air system and for providing an effective cooling circulation of the cooling fluid is limited. Furthermore, complex cooling systems are expensive and the reliability is low. Moreover, a high amount of cooling air my affect negatively the turbine performance.

Moreover, in a gas turbine, axial gaps, required for assembly and thermal expansion during operation between the various gas path components such as the inner casing elements, may allow ingress of hot gas into the cavities outside of the gas paths boundary. The cavities are generally formed between inner casing elements and supporting structures for the inner casing elements.

Hot gas ingress is undesirable because it leads to the requirement for expensive high-grade temperature resistant materials for the components of the turbine that are in contact with the hot gas outside the main flow annulus. In order to reduce the temperature, a high amount of purge air (cooling air) is then required to prevent or limit the hot gas ingestion, which typically exceeds the need for cooling purposes of the walls defining the main flow annulus. The amount of purge air may be significant due to the size of the outer volume itself but also due to the presence of circumferential pressure variations in the main fluid direction of the hot gas in an inner volume of the turbine, which causes higher ingress. The circumferential pressure variations in the working fluid are caused by the vanes inside the inner volume of the turbine. The high amount of purge air leads generally to an engine performance loss, both as a lower specific power output and reduced cycle efficiency. In some engine designs, the availability of coolant supply pressure and or in combination with coolant mass flow may be limited which gives potential for hot gas ingress and or further performance losses as a coolant of higher pressure will have to be used.

In conventional approaches, the cavities which are formed between inner wall elements, inner casing elements and outer casing elements are purged with sufficient compressed air to reduce and to eliminate hot gas ingress or reduce it to an acceptable level.

U.S. Pat. No. 6,402,466 B1 discloses a leaf seal for gas turbine stator shrouds and a nozzle band. A leaf seal assembly is secured to a trailing edge of a shroud segment for sealing between the shroud segment and the leading edge sidewall of a nozzle outer band. The leaf seals include a circumferentially elongated seal plate biased by a pair of spring clips disposed in a groove along the trailing edge of the shroud segment to maintain the seal plate in engagement with the flange on the leading edge sidewall of the nozzle outer band.

SUMMARY OF THE INVENTION

It is an objective of the present invention to provide a more efficient cooling of turbine parts.

This objective may be solved by a turbine, in particular a gas turbine, and by a method of operating a turbine, in particular a gas turbine.

According to a first aspect of present invention, a turbine, in particular a gas turbine, is presented. The turbine comprises a first inner wall, a second inner wall, an inner casing and a shield element. The first inner wall and the second inner wall are mounted to the inner casing. The first inner wall and the second inner wall are arranged such that an inner volume, through which a working fluid of the turbine is flowable, is separated from an outer volume, through which a cooling fluid is flowable. The first inner wall, the second inner wall and the inner casing are arranged with respect to each other such that the cavity is formed in the outer volume. The shield element is arranged inside the cavity such that the shield element separates the cavity in an inner region and an outer region which is formed in a radially outer position in comparison to the inner region. A gap is formed between the first inner wall and the second inner wall, through which gap the working fluid is flowable between the inner volume and the inner region. The shield element is arranged in the cavity such that the fluid inlet is formed, through which the cooling fluid is injectable from the outer region to the inner region for generating a predefined recirculation of the working fluid and the cooling fluid inside the inner region.

According to a further aspect of the present invention, a method of operating a turbine, in particular a gas turbine, is presented. The method comprises the transporting of a working fluid of the turbine through an inner volume. Furthermore, a cooling fluid is transported through an outer volume of the turbine. A first inner wall and a second inner wall are mounted to an inner casing of the turbine wherein the first inner wall and the second inner wall are arranged such that the inner volume is separated from the outer volume. The first inner wall and the second inner wall and the inner casing are arranged with respect to each other such that the cavity is formed in the outer volume. A shield element is arranged inside the cavity such that the shield element separates the cavity in an inner region and an outer region which is formed in a radially outer position in comparison to the inner region. According to the method, a part of the working fluid is forwarded between the inner volume and the inner region through a gap. The first inner wall and the second inner wall are arranged with respect to each other such that the gap between each other is formed. Further, according to the method, the cooling fluid is injected through a fluid inlet of the shield element from the outer region to the inner region for generating a predefined circulation of the part of the working fluid and the cooling fluid inside the inner region.

The terms "inner" and "outer" define a position relative to each other in a radial direction seen from the rotational axis of the turbine. The axial direction and the radial direction of the turbine are defined by a turbine shaft of the turbine. The rotational axis of the turbine shaft defines an axial direction. The radial direction describes a direction to or from the center point of the turbine shaft i.e. the rotational axis, wherein the radial direction is perpendicular to the axial direction. The term "annular" describes a shape of a turbine part which has substantially an annular run in circumferential direction partially around the turbine shaft.

The first and second inner walls describe the parts of the turbine which separate the inner volume from the outer volume. The wall elements may be attached to the vane carriers for example an inner casing. In particular, the inner walls are fluid path walls, along which the working fluid of the turbine inside the inner volume flows. The inner walls may comprise an annular shape at least partially around the turbine shaft, wherein between a radially inner surface of the inner walls and the turbine shaft the inner volume is generated.

Inside the inner volume, the working fluid, such as combustion gas or steam, flows along a substantially axial direction, although increments of the flow path may have an at least tangential direction. Inside the inner volume, the airfoils of the stator vanes and the rotor blades are exposed to the working fluid.

The inner casing describes a supporting structure in particular for the inner walls. The inner casing may comprise an annular shape, for example. To the inner casing, functional devices, such as sensor elements, and a cooling duct system for guiding cooling air, may be installed. The inner casing may be mounted to an outer casing, which may be the main pressure barrier of the gas turbine. The first and second inner wall may be mounted to different inner casings which in turn may be mounted to the same or to different sections of the outer casing or casings. The turbine may have a design in which only one inner casing without any further intermediate or outer casings are applied. Alternatively, the turbine may have a design in which the inner casing is additionally surrounded by an outer casing.

Between the inner walls and the inner casing (and/or the outer casing) the outer volume is formed. Through the outer volume, a cooling fluid, i.e. purge air, is transportable in order to cool the inner walls which are heated up by the working fluid inside the inner volume.

Between the inner casing and the first and second inner walls cavities are formed due to design, manufacturing and or assembly restrictions and for reducing the weight of the turbine. The cavities are used for transporting cooling air therethrough in order to cool the inner walls.

Between the first inner wall and the second inner wall a gap is formed. Through the gap, hot working fluid may ingress inside the cavity. The gap is formed due to the thermal expansion of the material of the inner walls.

Hence, in order to prevent the transportation of hot working gas inside the cavity, the cooling fluid (purge air) streams through the cavity in order to ventilate and cool the components that surround the cavity and in order to increase the pressure inside the cavity such that the ingress of hot working fluid is reduced. In particular, it is an aim to increase the pressure of the cooling fluid inside the cavity such that the pressure inside the cavity is higher than the pressure inside the inner volume.

The cavities formed between the inner walls and the inner casing comprise an annular shape and run around a circumferential direction around the turbine shaft. Hence, the cavities may comprise a large volume. For this reason, a high amount of cooling fluid has to be injected inside the cavity in order to generate a sufficient cooling capacity and in order to increase the pressure inside the cavity. The injection of a high amount of cooling air leads to a high amount of the cooling air which is also injected through the gap inside the inner volume. Hence, much energy for providing the cooling fluid flow is needed, rather than expanding the same fluid flow as additional hot gas through the turbine, after it has been heated in the combustion chamber, to generate mechanical work. Due to the high amount of cooling air flowing through the gap, the turbine efficiency is reduced as well.

By the present invention, a shield element is installed in an above-described cavity. The shield element may comprise a metal strip or metal plate which has an annular shape and thus extends in annular direction around the turbine shaft. The shield element may for example take the shape of an annular one piece ring or cylinder or may be built up by several segments. The shield element is mountable to or against the inner casing, for example, so that the shield element is contact-free with the inner walls.

By installing the shield element into the cavity, the cavity is separated into an inner region, which is located between the inner walls and the shield element, and an outer region, which is located between the inner casing or outer casing parts and the shield element.

Hence, the volume of the cavity is split into a volume of the inner region and a volume of the outer region. Hence, the volume of the inner region may be kept small, in particular smaller than the volume of the outer region. Hence, a high pressure for generating a positive flow of the cooling fluid out from the inner region to the inner volume, which is necessary for preventing ingress of the hot gas into the cavity, may only be applied inside the inner region. When applying a high pressure in a smaller volume, in particular inside the inner region, a smaller amount and less volume flow of cooling fluid and hence less energy for transporting the cooling fluid are necessary, in comparison to a high pressure being present in a large volume, in particular inside the complete cavity.

In particular, the shield element, such as a shield plate, separates the inner region from the outer region in such a way, that a fluid inlet is formed by the shield element through which fluid inlet the cooling fluid passes the shield element from the outer region into the inner region. The fluid inlet may be formed between the edges of the shield plate together with adjacent turbine parts or may be formed by through holes inside the shield element.

The fluid streaming through the fluid inlet from the outer region into the inner region intermixes with the hot working fluid inside the inner region. By the intermixing of the cooling fluid with the hot working fluid, the overall temperature of the mixture is reduced. If the pressure inside the inner region is increased sufficiently, a time averaged positive flow outwards from the inner region to the inner volume around the entire circumference is generated and the temperature of the mixture of cooling fluid and hot working gas is kept under control.

Furthermore, the shield element, such as a thin metal strip, may function as a heat shield. The shield element is placed in the cavity adjacent to the (axial) gap, through which the working gas may ingress into the inner cavity. By the shield element, the quantity of cooling fluid (purge air) and the clearance between the shield element and the inner walls is adjusted and controlled. In particular, the shield element is arranged close to the gap such that a small inner region of the cavity is formed by the shield element. In particular, the inner region is smaller than the outer region.

This has the effect, that the hot working gas will be contained in the smaller inner region of the cavity which is defined by the shield element and the inner walls (i.e. the working path end walls). The circumferential pressure variation seen at the inner walls is damped by the inner region of the cavity, because a higher pressure may be generated in the smaller inner region. Hence, no or a reduced ingress of hot working gas occur through the gap. In particular, the hot working gas that is ingressed through the gap inside the inner region will recirculate in the inner region of the cavity rather than continuing flowing into the outer region of the cavity.

Moreover, the above-described exemplary embodiment of the invention has the effect, that the components forming the outer region of the cavity, such as the inner casing and/or the outer casing, will be shielded from radiation and convection from the hot working gas by the shield element.

Hence, the reduced heat radiation and convection into the cavity which is reduced by the shield element reduces further the required cooling fluid requirement which leads to an enhanced engine and turbine performance. Moreover, the turbine components will be properly cooled, wherein the reduced component temperatures lead to a cost reduction and/or a life extension.

According to a further exemplary embodiment, the gap is formed between a first end section of the first inner wall and a second end section of the second inner wall. The first end section overlaps with the second end section. The first end section and the second end section overlaps in such a way, that the gap forms between the first end section and the second end section a fluid channel through which the working fluid is flowable from the inner volume into the outer volume. In particular, the overlap is formed in axial direction. Hence, by forming the overlap, the fluid stream injecting inside the inner volume or in opposite direction inside the outer volume, flows substantially along an axial direction. Hence, by the injection direction of the working fluid a recirculation of the working fluid is controllable and a more homogeneous mixture with the cooling fluid and the working fluid in the inner region may be achieved. In addition the injected cooling air may provide a film like cooling effect on the surface of the inner wall facing the inner volume.

According to a further exemplary embodiment, the first end section is arranged in a radially inner position with respect to the second end section, so that the working fluid is flowable through the gap (fluid channel) in a flow direction which has a component that is orientated in opposite direction with respect to a main flow direction of the working fluid of the turbine.

According to a further exemplary embodiment, the first end section is arranged in a radially outer position with respect to the second end section, so that the working fluid is flowable through the gap in a flow direction which has a component that is orientated in a same direction with respect to a main flow direction of the working fluid of the turbine.

Hence, by controlling the overlap of the end section, a direction of the fluid streaming is controllable, in particular for achieving an efficient circulation in the inner region and/or to achieve an efficient injection of the mixture of cooling fluid and working fluid from the inner region of the cavity inside the inner volume.

"Overlap" means that at a specific axial position, the first end section and the second end section may face each other along the axial direction such that a radial outward surface of the first section is facing a radial inward section of the second section. An annular passage is formed.

According to a further exemplary embodiment, the shield plate comprises at least one edge which forms with at least one of the first inner wall, the second inner wall and the inner casing the fluid inlet. In particular, the (annular) shield element defines a further flow channel for the cooling fluid from the outer region into the inner region. By arranging and adjusting the shield element within the cavity, the size of the fluid inlet is controllable, such that the volume flow of the cooling fluid into the inner region is controllable. In other words, by the arrangement and the design of the shield element a volume flow control of the cooling fluid inside the inner region is achieved.

A further aspect of this arrangement is that if there are two inlets e.g. upstream and downstream relative to the inner volume flow direction, the cooling fluid split between the two inlets can be divided by the positioning of the shield element.

According to a further exemplary embodiment of the present invention, the fluid inlet has a nozzle-like profile for accelerating the cooling fluid when flowing from the outer region to the inner region. For example, the fluid inlet forms a flow cross-section, wherein the cooling fluid may be accelerated when flowing through the flow area of the flow cross-section. In particular, the nozzle-like profile of the fluid inlet may comprise a varying cross-sectional area so that the fluid stream inside the inner cavity may be controlled, in particular the flow speed and the flow mass may be controlled by the nozzle-like profile. The advantages of this arrangement are at least twofold. The accelerated flow generates an increased heat transfer coefficient, which improve the cooling of the inner wall. The accelerated flow also creates a larger momentum, restricting the flow ingestion of hot expanding gases in the inner region and further communication with the outer region.

According to a further exemplary embodiment, the at least one edge of the shield element is an upstream edge, which is formed with respect to a main flow direction of the working fluid of the turbine at an upstream end of the shield element such that the cooling fluid which is flowable around the upstream edge from the outer region to the inner region has a flow direction which has a component that is orientated in a same direction with respect to the main flow direction of the working fluid.

According to a further exemplary embodiment, the at least one edge of the shield element is a downstream edge which is formed with respect to a main flow direction of the working fluid of the turbine at a downstream end of the shield plate such that the cooling fluid is flowable around the downstream edge from the outer region to the inner region has a flow direction which has a component that is orientated in an opposite direction with respect to the main flow direction of the working fluid.

The turbine may be a gas turbine, which comprises selectively a combustion chamber, or a steam turbine for example.

It has to be noted that embodiments of the invention have been described with reference to different subject matters. In particular, some embodiments have been described with reference to apparatus type claims whereas other embodiments have been described with reference to method type claims. However, a person skilled in the art will gather from the above and the following description that, unless other notified, in addition to any combination of features belonging to one type of subject matter also any combination between features relating to different subject matters, in particular between features of the apparatus type claims and features of the method type claims is considered as to be disclosed with this application.

BRIEF DESCRIPTION OF THE DRAWINGS

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION

The illustrations in the drawings are schematical. It is noted that in different figures, similar or identical elements are provided with the same reference signs.

Figure 1:
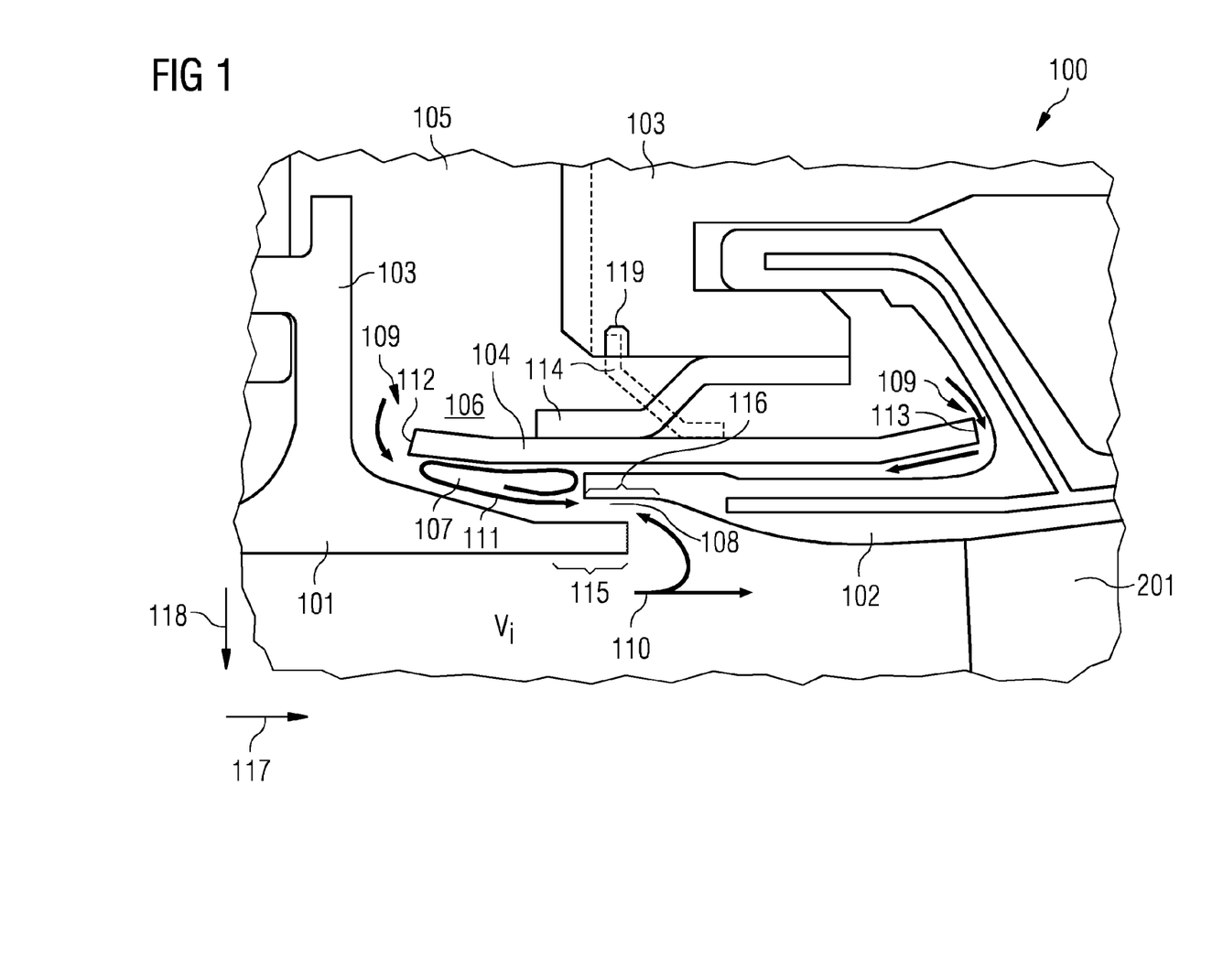
FIG. 1 shows a detailed view of a section of a turbine comprising a cavity, in which a shield element is installed according to an exemplary embodiment of the present invention.

FIG. 1 shows a turbine 100, in particular a gas turbine. The turbine 100 comprises a first inner wall 101, a second inner wall 102, an inner casing 103 and a shield element 104. The first inner wall 101 and the second inner wall 102 are mounted to inner casings 103. The first inner wall 101 and the second inner wall 102 are arranged such that an inner volume Vi, through which a working fluid 110 of the turbine 100 is flowable, is separated from an outer volume Vo, through which a cooling fluid 109 is flowable. The first inner wall 101, the second inner wall 102 and the inner casings 103 are arranged with respect to each other such that a cavity 105 is formed in the outer volume Vo. The shield element 104 is arranged inside the cavity 105 such that the shield element 104 separates the cavity 105 in an inner region 107 and an outer region 106, which is formed in a radially outer position in comparison to the inner region 107. A gap 108 is formed between the first inner wall 101 and the second inner wall 102. Through the gap 108 the working fluid 110 is flowable between the inner volume Vi and the inner region 107. The shield element 104 is arranged in the cavity 105 such that a fluid inlet is formed, through which the cooling fluid 109 is injectable from the outer region 106 to the inner region 107 for generating a predefined recirculation of the working fluid 110 and the cooling fluid 109 inside the inner region 107.

As shown in FIG. 1, the inner region 107 comprises a smaller volume than the outer region 106.

For having a better overview, the axial direction 117 and the radial direction 118 is shown. The axial direction 117 is parallel to the rotational axis of a turbine shaft for example. The radial direction 118 points for example to a center point of the turbine shaft and to the rotational axis of the turbine shaft, respectively.

In particular, the turbine component, such as the inner walls 101, 102 and the inner casing 103, and the cavities 105 extend substantially along a circumferential direction around the turbine shaft.

Moreover, in FIG. 1, the flow of the working fluid 110 is shown in the inner volume Vi. In particular, most of the working fluid flows substantially parallel to the axial direction 117. A part of the working fluid 110 may flow through the gap 108 between the first inner wall 101 and the second inner wall 102.

The flow of the part of the working fluid 110 through the gap may be caused for example by the rotation of rotor blades 202 (shown in FIG. 2) which cause pressure differences and thus fluid flow direction changes in the region of the inner walls 101, 102. For this reason, a part of the working fluid 110 flows through the gap 108 inside the inner region 107 of the cavity 105.

The flow of the working fluid inside the inner region 111 is blocked by the shield element 104 which is arranged inside the cavity 105. The working fluid 110 inside the inner region 107 may heat up the shield element 104 instead of e.g. the inner casing 103. Hence, the shield element 104 may function as a thermal absorber element, for example.

Moreover, between an upstream edge 112 and/or a downstream edge 113 of the shield element 104 the fluid inlet is formed. Through the fluid inlet, the cooling fluid 109 flows inside the inner region 107 and intermixes with the working fluid 110. In particular, dependent on the injection direction and the flow volume of the cooling fluid 109 through the fluid inlet inside the inner region 107, a predefined recirculation of the cooling fluid/working fluid mixture 111 is determinable and controllable. In particular, the recirculation of the cooling fluid/working fluid mixture 111 may be controlled in such a way, that a flow stream of the cooling fluid/working fluid mixture 111 is directed to the gap 108 in order to counteract against the ingressing working fluid 110 from the inner volume Vi.

By the predefined arrangement of the shield element 104 inside the cavity 105, the size and the profile of the fluid inlet is predefinable and controllable, such that a predefined streaming of the cooling fluid 109 inside the inner region 107 is controllable and hence the recirculation of the cooling fluid/working fluid mixture 111.

For example, as shown in FIG. 1, the upstream edge 112 forms the fluid inlet with the surface of the first inner wall 101 and/or with parts of the inner casing 103 in such a way, that a large flow cross-section of the fluid inlet is formed. A further fluid inlet is formed between a downstream edge 113 of the shield element 104 and a part of a surface of the second inner wall 102.

In the exemplary embodiment shown in FIG. 1, the fluid inlet (i.e. its flow cross-section) formed by the upstream edge 112 is larger than the further fluid inlet formed by the downstream edge 113 of the shield element 104, i.e. a shield plate. Hence, the volume flow of the cooling fluid 109 through the upstream located fluid inlet is higher than the volume flow of the cooling fluid 109 through the further downstream located fluid inlet. Hence, the direction of the recirculation of the cooling fluid/working fluid mixture 111 as shown in FIG. 1 is achievable. One reason for this split of the volume flow is that the leading edge of the guide vane airfoil inside the inner volume generates a local pressure peak in the region of the inner surface of the inner wall elements 101, 102, which pressure peaks tends to push the working fluid in through the gap 108 into the inner region 107.

The term "upstream" and the term "downstream" describe a part of the turbine component, such as the shield element 104, in comparison to the main flow of the working fluid 110 inside the inner volume Vi, which is substantially parallel to the axial direction 117.

Hence, the exact and predetermined location of the shield element 104 defines the fluid inlet and the further fluid inlet. The shield element 104 may be fixed to e.g. the inner casing 103 by carrier elements 114. The carrier elements 114 may be for example metal fingers, which are mounted on the one side to the shield element 104 and on the other side to a (annular formed) groove 119 inside the inner casing 103. For example, the carrier elements 114 may be elastic, such that dependent on the pressure inside the inner region 107 or the outer region 106 the position of the shield element 104 inside the cavity 105 is adjusted, which results in an amendment of the flow cross-section of the fluid inlet. Hence, if the pressure in the inner region 107 would increase, the shield element 104 may be bent away from the first inner wall 101 such that the fluid inlet, formed between the upstream edge 112, would increase and more cooling fluid would be injected inside the inner region 107.

The carrier elements 114 have two functions, to provide a radial centricity (solid lines in FIG. 1) and an axial location (dashed lines in FIG. 1). The radial centricity can be provided by an annular shaped element with or without scallops, preferable having apertures in order to provide the downstream side of carrier element with cooling fluid.

Moreover, as shown in FIG. 1, the first inner wall 101 comprises a first end section 115 and the second inner wall 102 comprises a second end section 116. The first end section 115 and the second end section 116 may overlap each other along the axial direction 117. Hence, the gap 108 is formed between the first end section 115 and the second end section 116, such that a fluid channel along the axial direction 117 may be formed.

As shown in FIG. 1, the first end section 115 is arranged in a radially outer position (along the radial direction 118) with respect to the second end section 116 so that the working fluid 110 is flowable through the gap 108 in a flow direction which has a component that is orientated in the same direction with respect to the main flow direction of the working fluid 110. Hence, if the pressure inside the inner region 107 would increase the pressure inside the inner volume Vi, the cooling fluid/working fluid mixture 111 would be injected inside the inner volume Vi, wherein the injection direction would be in particular in the same direction as the main flow direction, such that turbulences and vortexes would be reduced.

Preferably, the shield element 104 may be mountable to or against the inner casing 103, for example, so that the shield element 104 is contact-free with the inner walls and may only be held by the carrier element 114. As a result cooling fluid may flow along all sides of the shield element 104, in particular around the upstream edge 112 and the downstream edge 113.

Preferably the shield element 104 acting as a heat shield overlaps a section of the first inner wall 101 including the first end section 115. Preferably the shield element 104 extends also in axial direction such that it also overlaps a large portion of the second inner wall 102—i.e. the upstream end of a vane platform—such that cooling fluid is also guided by the shield element 104 along the radial outward surface of the vane platform.

Figure 2:
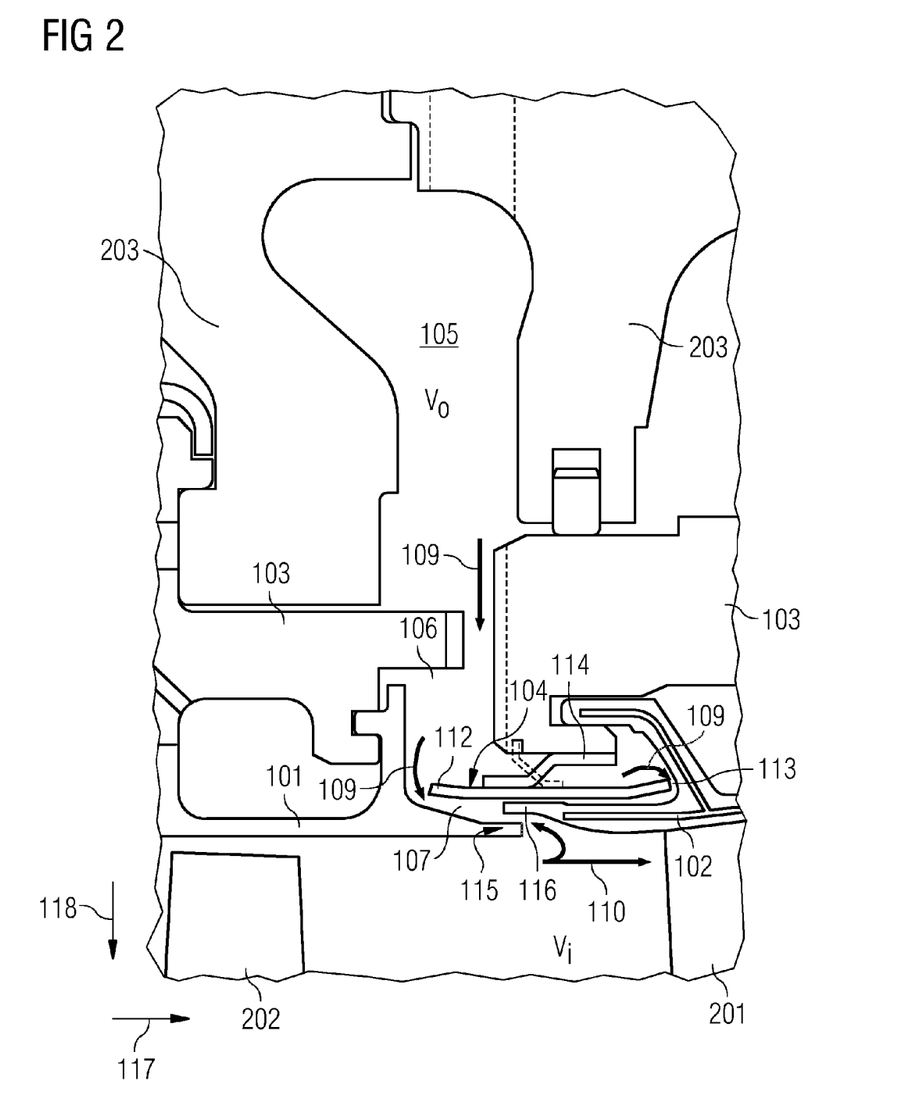
FIG. 2 shows a detailed view of the turbine as shown in FIG. 1, wherein the outer casing is shown according to an exemplary embodiment of the present invention.

FIG. 2 shows a further section of the turbine 100 as shown in FIG. 1. In particular, the schematical view of FIG. 2 illustrates the similar features as already shown in FIG. 1. Additionally, the outer casing 203 is shown. The inner casing 103, which supports the inner walls 101, 102, and for example the shield element 104 are mounted to and are supported by the outer casing 203.

Moreover it is shown that in the inner volume Vi the airfoils of stator vanes 201 and the rotor blade 202 are installed. In particular, due to the rotation of the rotor blade 202, pressure differences of the working fluid 110 in a region of the gap 108 in front of the stator vanes 201 leading edges may be generated, which may lead to a hot working fluid ingress into the inner region 107.

The cavity 105 may particularly be located in the area between a compressor turbine and a power turbine, i.e. between a turbine blade which is most downstream blade of a turbine section to drive the compressor and a vane which is a most upstream vane of a turbine section to drive an attached generator.

Figure 3:
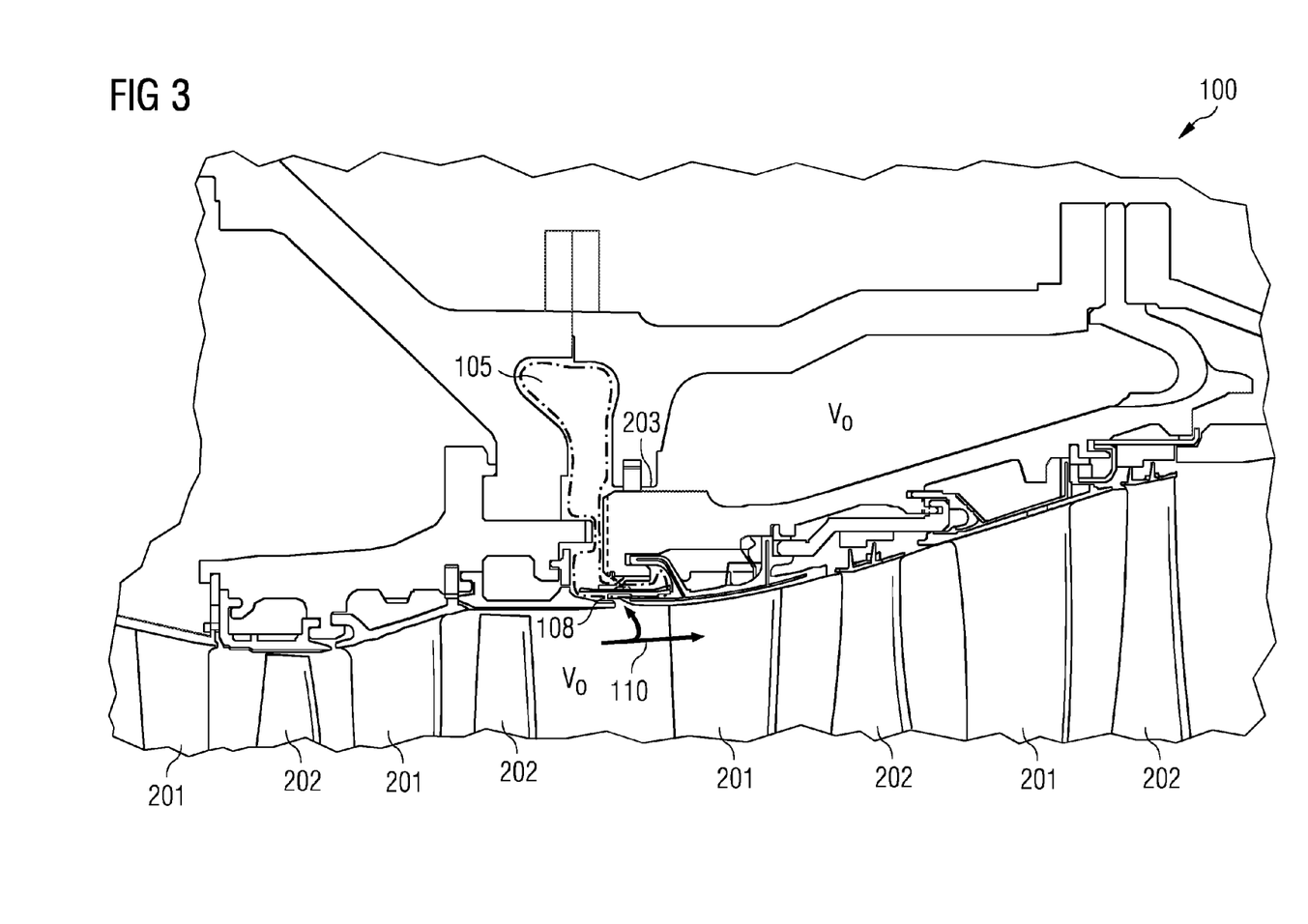
FIG. 3 shows a schematical view of a turbine according to an exemplary embodiment of the present invention.

FIG. 3 shows for a better overview a further larger section of the turbine stage of the turbine 100 according to an exemplary embodiment of the present invention. In particular, the cavity 105 is shown, into which the features shown in FIG. 1 and FIG. 2 may be installed. FIG. 3 shows the outer casing 203, wherein between the outer casing 203 and the inner walls 101, 102 the outer volume Vo is formed. Inside the outer volume Vo cavities 105 are generated. By the gap 108, the hot working fluid 110 is injected into the cavity 105. As can be taken from FIG. 3, a number of stator vanes 201 and rotor blades 202 are installed inside the inner volume Vi in an alternating manner.

In FIG. 3, the left four vanes and blades will belong particularly to a compressor turbine. The right four vanes and blades may possibly belong to a power turbine.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

The invention claimed is:

1. A turbine, comprising:
   a first inner wall;
   a second inner wall;
   an inner casing, and
   a shield element;
   wherein the first inner wall and the second inner wall are mounted to the inner casing,
   wherein the first inner wall and the second inner wall are arranged such that an inner volume, through which a working fluid of the turbine is flowable, is separated from an outer volume, through which a cooling fluid is flowable,
   wherein the first inner wall, the second inner wall and the inner casing are arranged with respect to each other such that a cavity is formed in the outer volume,
   wherein the shield element is arranged inside the cavity such that the shield element separates the cavity in an inner region and an outer region which is formed in a radially outer position in comparison to the inner region,
   wherein a gap is formed between the first inner wall and the second inner wall, through the gap the working fluid is flowable between the inner volume and the inner region, and
   wherein the shield element is arranged in the cavity such that a fluid inlet is formed, through which the cooling fluid is injectable from the outer region to the inner region for generating a predefined recirculation of the working fluid and the cooling fluid inside the inner region.

2. The turbine according to claim 1, wherein the gap is formed between a first end section of the first inner wall and a second end section of the second inner wall, wherein the first end section overlaps with the second end section.

3. The turbine according to claim 2, wherein the first end section is arranged in a radially inner position with respect to the second end section so that the working fluid is flowable through the gap in a flow direction which has a component that is orientated in opposite direction with respect to a main flow direction of the working fluid of the turbine.

4. The turbine according to claim 2, wherein the first end section is arranged in a radially outer position with respect to the second end section so that the working fluid is flowable through the gap in a flow direction which has a component that is orientated in a same direction with respect to a main flow direction of the working fluid of the turbine.

5. The turbine according to claim 1, wherein the shield element comprises at least one edge which forms with at least one of the first inner wall, the second inner wall and the inner casing the fluid inlet.

6. The turbine according to claim 5, wherein the fluid inlet has a converging profile for accelerating the cooling fluid when flowing from the outer region to the inner region.

7. The turbine according to claim 5, wherein the at least one edge of the shield element is an upstream edge, which is formed with respect to a main flow direction of the working fluid of the turbine at an upstream end of the shield element such that the cooling fluid which is flowable around the upstream edge from the outer region to the inner region has a flow direction which has a component that is orientated in a same direction with respect to the main flow direction of the working fluid.

8. The turbine according to claim 5, wherein the at least one edge of the shield element is a downstream edge which is formed with respect to a main flow direction of the working fluid of the turbine at a downstream end of the shield element such that the cooling fluid, which is flowable around the downstream edge from the outer region to the inner region, has a flow direction which has a component that is orientated in a opposite direction with respect to the main flow direction of the working fluid.

9. A method for operating a turbine, comprising:
transporting a working fluid of the turbine through an inner volume;
transporting a cooling fluid through an outer volume of the turbine,
   wherein a first inner wall and a second inner wall are mounted to an inner casing of the turbine, wherein the first inner wall and the second inner wall are arranged such that the inner volume is separated from the outer volume,
   wherein the first inner wall, the second inner wall and the inner casing are arranged with respect to each other such that a cavity is formed in the outer volume,
   wherein a shield element is arranged inside the cavity such that the shield element separates the cavity in an inner region and an outer region which is formed in a radially outer position in comparison to the inner region,
forwarding a part of the working fluid between the inner volume and the inner region through a gap;
   wherein the first inner wall and the second inner wall are arranged with respect to each other such that the gap between each other is formed, and
injecting the cooling fluid through a fluid inlet of the shield element from the outer region to the inner region for generating a predefined recirculation of the part of the working fluid and the cooling fluid inside the inner region.

* * * * *